Nov. 25, 1930.  A. T. DWIGHT  1,783,111
STRAINER
Filed Jan. 4, 1930

WITNESSES

INVENTOR
Amos T. Dwight
BY
ATTORNEYS

Patented Nov. 25, 1930

1,783,111

UNITED STATES PATENT OFFICE

AMOS T. DWIGHT, OF RED BANK, NEW JERSEY

STRAINER

Application filed January 4, 1930. Serial No. 418,567.

This invention relates to strainers.

It is among the objects of the present invention to provide a novel and improved sanitary strainer particularly adapted for use as a milk strainer to be received in the mouth of a milking pail during the milking operation.

A further object of the present invention is to provide a milk strainer of substantially concave configuration, whereby upon reception in the mouth of a milking pail, it will not add to the height of the pail and thus interfere with the milking operation.

A further object of the present invention is to provide in a strainer of the class described, an improved strainer cloth assembly including a removable apertured plate and a novel securing means therefor, which will retain the plate to engage the cloth by resilient means. The securing member for the cloth assembly is formed in a novel and simple manner whereby the same may be readily detached after each milking operation.

Other objects of the present invention will be apparent from a consideration of the following specification taken in conjunction with the accompanying drawings, in which Figure 1 is a vertical section of one form of the present invention, illustrating its position with respect to a milking pail;

Referring more particularly to the drawings, it will be seen that the strainer of the present invention includes a body 10 of substantially frusto-conical configuration, thus forming a concave strainer assembly. The upper outer edge of the body is provided with a suitable reinforcing edge bead 11, against which the upper edge bead 12 of the milking pail, as indicated by the dotted lines, is adapted to rest. The bead 11 serves the double function of providing a reinforcing terminal bead on the body, and of retaining the strainer in proper position within the mouth of the milking pail as indicated. The lower edge of the strainer body 10 is also provided with a bead, as indicated at 14, which acts as a reinforcing bead for the lower edge, and also serves for maintaining the alignment of the strainer cloth and apertured securing member therefor, as will be hereinafter described.

Figure 1:
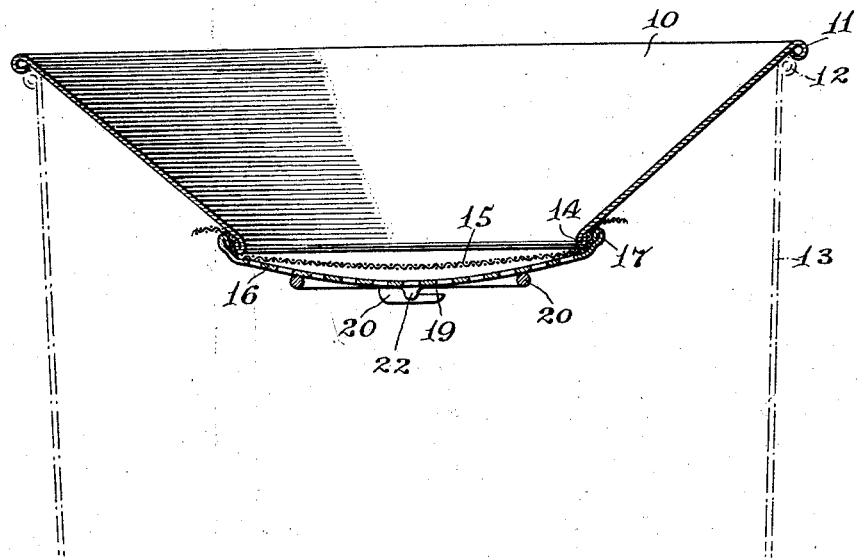
Figure 2:
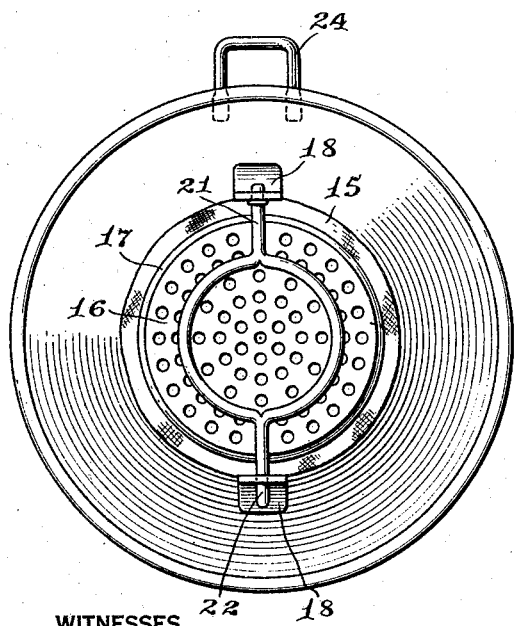
Fig. 2 is a bottom plan view of the device showing the strainer assembly.
Figure 3:
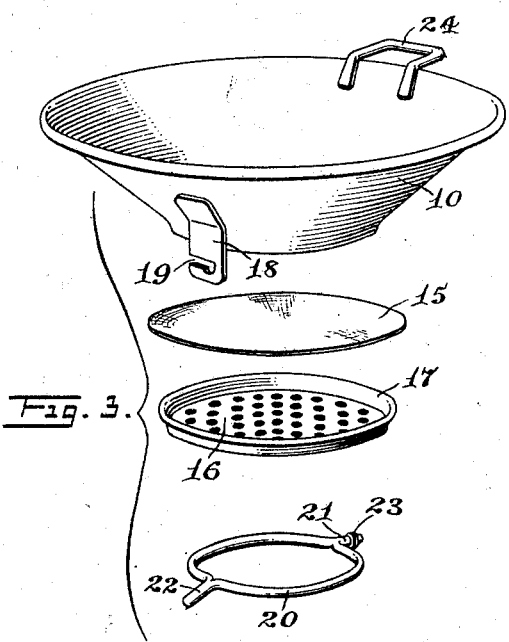
Fig. 3 is a perspective disassembled view of the various parts of the strainer.

Secured across the inner end of the body 10, a strainer cloth 15 is provided. The cloth 15 may be of any suitable straining material, but is preferably of outing flannel to insure proper straining of the milk as it passes through the strainer into the pail. For securing the cloth in position, as indicated in Fig. 1, an apertured dish-shaped securing member 16 is provided, the outer edges of which extend upwardly and are provided with an edge bead 17, which is adapted to co-operate with the edge bead 14 of the body 10 to secure the edges of the cloth 15 therebetween. For securing the member 16 in proper position for holding the cloth, the body 10 is provided with depending ears 18, one of which is provided with a central aperture, while the opposite one, as illustrated in Fig. 3, is provided with an open-sided slot 19. For engagement with the member 16, a securing bar 20 is provided, which includes a substantially ring-shaped central body having diametrically opposite extending ends 21 and 22. The end 21 is provided with a washer 23 and is adapted to be received in the apertured ear 18, the washer 23 limiting the inward motion of the end 21 in the aperture. The opposite end 22 is adapted to be slipped through the slot 19 to be received within its inner enlarged portion. The securing bar 20 is preferably formed of semiflexible material, the arrangement being such that the end 22 is sprung downwardly to be received within the slot 19, whereby the body of the ring exerts an even and continuous pressure around the center of the member 16, to insure proper grip of the cloth 15 between the beads 17 and 14.

The milk strainer of the present invention is completed by the provision of one or more suitable handles 24, and it will be seen that the structure provides a simple strainer adapted to removably retain a straining cloth. It will be seen that the removal of the parts for a changing of the cloth and for cleaning, is facilitated by the simple structure presented. Thus the device provides for maximum sanitation and a simple, inexpensive device, and further provides a strainer for milking pails which does not add to the height of the pail and thus encumber the milkmen in the performance of their duties.

From the foregoing it will be seen that only one form of the invention is here illustrated, and it will be understood that the invention is not specifically confined to the structural details shown, but that numerous changes, modifications and the full use of equivalents may be resorted to without departing from the spirit or scope of the invention as outlined in the appended claim.

What is claimed is:

A milk strainer, including a substantially frusto-conical body, apertured ears depending from said body adjacent its inner end, an apertured strainer cloth securing member adapted to fit over said inner end of said body, said member being dish-shaped to provide a central portion below the plane of the inner end of said body, and a securing ring for said member including end fingers engageable within the apertures of said ears, said apertures being above the central portion of said member whereby said ring must be sprung to have its ends received in said apertures thus to provide spring tension on said member.

AMOS T. DWIGHT.